(12) United States Patent
Jang et al.

(10) Patent No.: US 11,560,491 B2
(45) Date of Patent: Jan. 24, 2023

(54) LIQUID COMPOSITION, DEVICE FOR APPLYING LIQUID COMPOSITION, IMAGE FORMING DEVICE, AND IMAGE FORMING METHOD

(71) Applicant: RICOH COMPANY, LTD., Tokyo (JP)

(72) Inventors: Dongsik Jang, Tokyo (JP); Yukitaka Watarai, Kanagawa (JP); Tsutomu Maekawa, Ibaraki (JP); Takashi Tamai, Kanagawa (JP); Atsufumi Hanazawa, Tokyo (JP); Koji Katsuragi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/772,474

(22) PCT Filed: Jan. 28, 2019

(86) PCT No.: PCT/JP2019/002680
§ 371 (c)(1),
(2) Date: Jun. 12, 2020

(87) PCT Pub. No.: WO2019/171817
PCT Pub. Date: Sep. 12, 2019

(65) Prior Publication Data
US 2020/0399495 A1    Dec. 24, 2020

(30) Foreign Application Priority Data

Mar. 6, 2018  (JP) .............................. JP2018-039901
Oct. 16, 2018 (JP) .............................. JP2018-195171

(51) Int. Cl.
*C09D 11/54*   (2014.01)
*B41J 2/21*    (2006.01)
(Continued)

(52) U.S. Cl.
CPC ............. *C09D 11/54* (2013.01); *B41J 2/2107* (2013.01); *B41J 2/2114* (2013.01); *B41M 5/0017* (2013.01); *C09D 11/322* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2005/0193921 A1* 9/2005 Ueki .................... B41M 5/0017
                                                    106/31.43
2005/0282928 A1* 12/2005 Lin ...................... B41M 5/0023
                                                    523/160
(Continued)

FOREIGN PATENT DOCUMENTS

CN       101909898      12/2010
CN       102574406      7/2012
(Continued)

OTHER PUBLICATIONS

International Search Report and Written Opinion dated Apr. 8, 2019 in PCT/JP2019/002680 filed on Jan. 28, 2019.
(Continued)

*Primary Examiner* — Manish S Shah
(74) *Attorney, Agent, or Firm* — Grüneberg and Myers, PLLC (57) ABSTRACT

A liquid composition includes an inorganic particle and a multivalent metal salt, wherein the liquid composition has a tacking force of 50 mN or less in an area of cast-coated paper where the liquid composition is applied in an amount of 0.12 mg/cm² for the cast-coated paper followed by heating at 80 degrees C. for 15 seconds.

19 Claims, 3 Drawing Sheets

(51) Int. Cl.
*B41M 5/00* (2006.01)
*C09D 11/322* (2014.01)

(58) Field of Classification Search
CPC ...... B41J 2/1755; B41J 2/2114; B41J 2/2117;
B41J 2/2056; B41J 2/21; B41J 2/0057;
B41J 3/60; B41J 2002/012; B41J
2/04598; B41J 2/04588; B41J 2/04595;
B41J 2/04586; B41J 2/14274; B41J
2/1623; B41J 2202/00; B41J 2202/03;
B41J 2/14201; B41J 2/045; B41J
11/0015; B41J 11/002; B41J 2/04581;
B41J 2/055; B41J 2/16538; B41J
2002/16502; B41J 29/02; B41J 2/17513;
B41J 2/17509; B41J 29/13; B41J
2/17553; B41J 2/1606; B41J 2/1642;
B41J 2/1609; B41J 2/164; B41J 2/162;
B41J 2/161; B41J 2/19; B41J 15/04;
B41J 25/001; B41J 25/34; B41J 25/003;
B41J 25/312; B41J 2025/008; B41J
2202/21; B41J 2/17596; B41J 2/16508;
B41J 2/1652; B41J 2/175; B41J 2/17563;
C09D 11/36; C09D 11/40; C09D 11/30;
C09D 11/38; C09D 11/32; C09D 11/322;
C09D 11/324; C09D 11/328; C09D
11/101; C09D 11/102; C09D 11/005;
C09D 11/54; C09D 11/52; C09D 11/106;
B41M 5/0011; B41M 5/0017; B41M
5/0023; B41M 5/0047; B41M 7/00;
B41M 7/0072; B41M 5/52; B41M
5/5218; B41M 5/5227

See application file for complete search history.

(56) References Cited

U.S. PATENT DOCUMENTS

| | | | | |
|---|---|---|---|---|
| 2008/0241397 A1* | 10/2008 | Kato | ............. | C09D 11/30 427/288 |
| 2010/0209611 A1 | 8/2010 | Ohshima et al. | | |
| 2011/0164086 A1* | 7/2011 | Ggoto | ............. | B41M 5/0017 347/21 |
| 2013/0155145 A1* | 6/2013 | Gotou | ............. | B41J 2/015 347/21 |
| 2014/0118449 A1* | 5/2014 | Sarkisian | ............. | B41J 2/2107 347/101 |
| 2014/0285588 A1* | 9/2014 | Aruga | ............. | B41J 2/1707 347/85 |
| 2015/0258796 A1 | 9/2015 | Tamai et al. | | |
| 2015/0259567 A1 | 9/2015 | Tamai et al. | | |
| 2016/0024323 A1 | 1/2016 | Tamai et al. | | |
| 2016/0137862 A1 | 5/2016 | Tamai et al. | | |
| 2016/0159110 A1* | 6/2016 | Beier | ............. | B41J 11/002 347/102 |
| 2016/0160161 A1 | 6/2016 | Tamai et al. | | |
| 2016/0222238 A1* | 8/2016 | Arai | ............. | B41M 5/0017 |

FOREIGN PATENT DOCUMENTS

| | | |
|---|---|---|
| CN | 103287141 | 9/2013 |
| CN | 103534099 | 1/2014 |
| CN | 104470726 | 3/2015 |
| EP | 2 055 497 A2 | 5/2009 |
| EP | 2 857 213 A1 | 4/2015 |
| JP | 2008-062503 | 3/2008 |
| JP | 2013-071277 | 4/2013 |
| JP | 2017-043727 | 3/2017 |
| JP | 2017-043729 | 3/2017 |
| WO | WO2012/170036 A1 | 12/2012 |
| WO | WO2016/130158 A1 | 8/2016 |

OTHER PUBLICATIONS

Chinese Office Action dated Dec. 15, 2021 in Chinese Application No. 201980009910.7, 10 pages.

* cited by examiner

LIQUID COMPOSITION, DEVICE FOR APPLYING LIQUID COMPOSITION, IMAGE FORMING DEVICE, AND IMAGE FORMING METHOD

TECHNICAL FIELD

The present disclosure relates to a liquid composition, a device for applying a liquid composition, an image forming device, and an image forming method.

BACKGROUND ART

Inks containing coloring materials such as pigments are known to be used for applications requiring water resistance and light resistance such as posters. If such an ink is discharged onto a low-absorptive recording medium such as coated paper for use in commercial printing by an inkjet recording method, adjacent droplets coalesce on the recording medium, causing image defect (beading). As a method of eliminating beading image defects, there is known a method of applying a processing liquid containing a multivalent metal salt, etc., aggregating the coloring material in the ink to a recording medium before discharging the ink.

An inkjet recording method has been proposed in JP-2013-71277-A which includes a first step of attaching a second processing liquid to a low-ink-absorptive or non-absorptive recording medium and a second step of discharging liquid droplets of a gloss ink composition containing a gloss pigment from nozzle orifices to attach the gloss pigment onto the second processing liquid attached to the recording medium. More specifically, the second processing liquid contains colloidal silica and at least one member selected from the group consisting of a cationic resin, a multivalent metal salt, and an organic acid.

CITATION LIST

Patent Literature

PTL 1: JP-2013-71277-A

SUMMARY OF INVENTION

Technical Problem

However, for example, if a member such as a roller contacts an area of a recording medium where a liquid composition such as a processing liquid is applied but an ink is not yet applied, the liquid composition may adhere to the member. Thereafter, the liquid composition adhering to the member may be transferred and adhere to another recording medium when it contacts the member. Alternatively, the liquid composition attached dries and contacts another recording medium. This may cause image defects in another recording medium due to density unevenness of the liquid composition.

Solution to Problem

As an embodiment of the present disclosure, a liquid composition is provided which includes an inorganic particle and a multivalent (polyvalent) metal salt, wherein the liquid composition has a tacking force of 50 mN or less in an area of cast-coated paper where the liquid composition is applied in an amount of $0.12$ mg/cm$^2$ followed by heating at 80 degrees C. for 15 seconds.

Advantageous Effects of Invention

According to embodiments of the present disclosure, a liquid composition is provided which is capable of preventing a liquid composition from adhering to a member which contacts an area of a recording medium to which the liquid composition is applied.

BRIEF DESCRIPTION OF DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

Next, an embodiment of the present disclosure is described.

Liquid Composition

The liquid composition of the present embodiment is applied to a recording medium before an ink is applied to the recording medium. The liquid composition contains an inorganic particle, a multivalent (polyvalent) metal salt, and optionally other components such as an organic solvent, water, and a surfactant. Hereinafter, the liquid composition may also be referred to as the processing liquid.

Inorganic Particle

If a member contacts an area of a recording medium where the liquid composition is applied but the ink is not applied yet, it is possible to reduce adhesion of the liquid composition to the member due to the inorganic particle contained in the liquid composition.

Specific examples of the inorganic particle include, but are not limited to, silicon oxide (SiO$_2$), aluminum oxide (Al$_2$O$_3$), titanium oxide (TiO$_2$), zinc oxide (ZnO), zinc peroxide (ZnO$_2$). Of these, titanium oxide (TiO$_2$), silicon oxide (SiO$_2$), and zinc oxide (ZnO) are preferable.

The volume average particle diameter of the inorganic particle is preferably from 5 to 50 nm in order not to affect images. Also, a small volume average particle diameter reads good.

In addition, the inorganic particle preferably accounts for 0.05 percent by mass or more, more preferably 0.1 percent by mass or more, and furthermore preferably 0.5 percent by mass or more of the total amount of the liquid composition. In addition, the inorganic particle preferably accounts for 2.0 percent by mass or less, more preferably 1.5 percent by mass or less, and furthermore preferably 1.0 percent by mass or less of the total amount of the liquid composition. Within this range, it is possible to reduce adhesion of the liquid composition to a member when the member contacts an area of a recording medium where the liquid composition is applied but the ink is not applied yet.

Figure 1A:
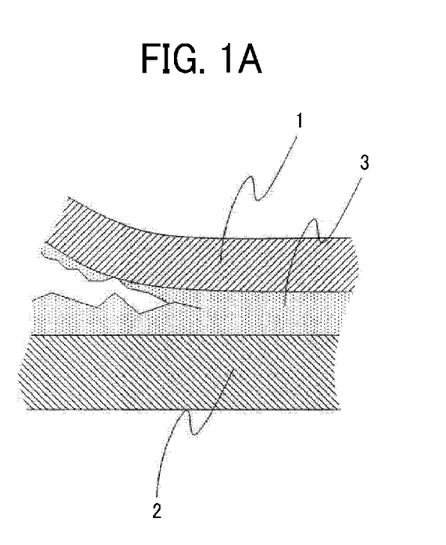
FIG. 1A is a schematic diagram illustrating an example of a state in which a recording medium where a liquid composition is applied is in contact with a member of an image forming device.
Figure 1B:
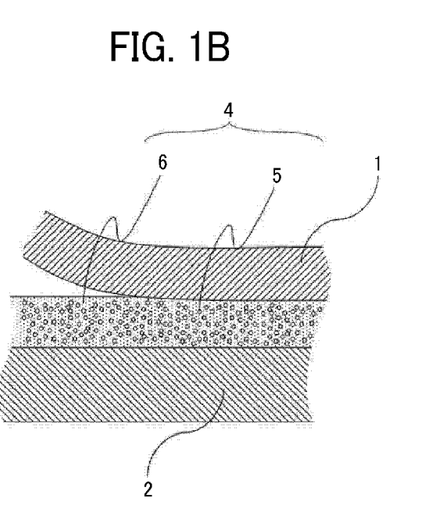
FIG. 1B is a schematic diagram illustrating another example of a state in which a recording medium where a liquid composition is applied is in contact with a member of an image forming device.

How the inorganic particle prevents the adhesion of the liquid composition to the member is described next with reference to FIG. 1. FIG. 1A is a schematic diagram illustrating an example of a state in which a recording medium where a liquid composition is applied is in contact with a member of an image forming device. In FIG. 1A, a member 1 of an image forming device contacts the layer formed by a liquid composition 3 applied onto a recording medium 2 and the liquid composition 3 does not contain an inorganic particle. In FIG. 1B, a member 1 of an image forming device contacts the layer formed by a liquid composition 4 applied onto a recording medium 2 and the liquid composition 4 contains an inorganic particle 5 and a component 6 other than the inorganic particle 5.

As illustrated in FIG. 1A, when the member 1 of the image forming device is separated from the recording medium 2 after the contact, the layer formed of the liquid composition 3 is in contact with both of the member 1 of the image forming device and the recording medium 2. Therefore, the layer formed of the liquid composition 3 is broken up and adheres to both of the member 1 of the image forming device and the recording medium 2. Moisture of the liquid composition 3 adhering to the member 1 of the image forming device naturally evaporates or forcibly evaporates by heat of the member 1 of the image forming device. As the moisture evaporates, the component such as the multivalent metal salt contained in the liquid composition 3 precipitates and fixates on the surface of the member 1 of the image forming device. The component of the fixating multivalent metal salt is visible because the fixating multivalent metal salt whitens. Next, the next recording medium 2 to which the liquid composition 3 is applied contacts the member 1 of the image forming device. Consequently, the liquid composition 3 applied to the recording medium 2 adheres to the member 1 of the image forming device. As the number of the recording media to which the liquid composition 3 is applied increases, this fixating material on the member 1 of the image forming device gradually thickens. Thereafter, this fixating material contacts the area of the recording medium 2 where the liquid composition 3 is applied and causes density unevenness of the liquid composition 3 on the recording medium 2 due to contact or transfer of the liquid composition 3 ascribable to the contact.

On the other hand, as illustrated in FIG. 1B, when the recording medium 2 where the liquid composition 4 containing the inorganic particle 5 is applied is separated from the member 1 of the image forming device, the layer formed of the liquid composition 4 contacting both of the recording medium 2 and the member 1 of the image forming device is detached from the member 1 of the image forming device without break-up due to the inorganic particle 5 contained in the liquid composition 4. This is because the liquid composition 4 containing the inorganic particles 5 is entangled with the fibers or the coating layer of the recording medium 2 so that the layer formed of the liquid composition 4 can be quickly separated from the member 1 of the image forming device. As a result, on the surface of the member 1 of the image forming device, fixation of the component such as the multivalent metal salt contained in the liquid composition 3 can be reduced. Density unevenness of the liquid composition on the recording medium 2 thereafter contacting the member 1 of the image forming device can be diminished.

If the recording medium 2 is low-absorptive or the member 1 of the image forming device is a heating device, the liquid composition 3 significantly fixates to the member 1 of the image forming device. Therefore, it is particularly preferable to use the liquid composition 4 that contains the inorganic particle 5 in such cases.

Multivalent Metal Salt

The multivalent metal salt associates with the coloring material in the ink by an electric charge action to form an aggregate of the coloring material, and separates the coloring material from the liquid phase to promote attachment onto the recording medium. In addition, when the liquid composition contains a multivalent metal salt, quality images can be formed even on a recording medium having a low ink-absorptivity while beading is prevented. Unlike a coagulant such as a cationic polymer, the multivalent metal salt is capable of reducing fixation of the liquid composition onto the member when the member contacts the area of a recording medium where the liquid composition is applied but the ink is not applied yet.

The multivalent metal salt has no specific limit and can be suitably selected to suit to a particular application. Examples are salts of titanium compounds, chromium compounds, copper compounds, cobalt compounds, strontium compounds, barium compounds, iron compounds, aluminum compounds, calcium compounds, magnesium compounds, zinc compounds, and nickel compounds. These can be used alone or in combination. Of these, in terms of effectively agglomerating pigments, salts of calcium compounds, magnesium compounds, and nickel compounds are preferable, and alkali earth metal salts of calcium compounds, magnesium compounds are more preferable.

There is no specific limit to the magnesium compound and it can be suitably selected to suit to a particular application.

Specific examples include, but are not limited to, magnesium chloride, magnesium acetate, magnesium sulfate, magnesium nitrate, and magnesium silicate. There is no specific limit to the calcium compound and it can be suitably selected to suit to a particular application. Specific examples include, but are not limited to, calcium carbonate, calcium nitrate, calcium chlorinate, calcium acetate, calcium sulfate, and calcium silicate. There is no specific limit to the barium compound and it can be suitably selected to suit to a particular application. For example, barium sulfate is usable. The zinc compound has no specific limit and is suitably selected to a particular application. For example, zinc sulfate and zinc carbonate are usable. The aluminum compound has no specific limit and is suitably selected to a particular application. For example, aluminum silicate and aluminum hydroxide are usable. Of these, magnesium sulfate, magnesium nitrate, calcium nitrate, etc., which have particularly high solubility in a liquid composition containing glycerin are preferable. In the liquid composition, the mass ratio of glycerin to the multivalent metal salt is preferably from 0.5 to 2.0, more preferably from 1.0 to 1.5, and furthermore preferably from 1.1 to 1.3.

Also, the multivalent metal salt is preferably contained in an amount of from 0.8 to 1.4 mol/L to the total amount of the liquid composition. When the amount of the multivalent metal salt is 0.8 mol/L or greater, it is possible to sufficiently control the beading problem even for a low-absorptive recording medium. When the amount is 1.4 mol/L or less, storage stability of the liquid composition is enhanced.

In addition, the multivalent metal salt preferably accounts for 10.0 percent by mass or more, more preferably 20.0 percent by mass or more, and furthermore preferably 22.0 percent by mass or more of the total amount of the liquid composition. In addition, the multivalent metal salt preferably accounts for 40.0 percent by mass or less, more preferably 30.0 percent by mass or less, and furthermore preferably 28.0 percent by mass or less of the total amount of the liquid composition.

In the liquid composition, the mass ratio of the inorganic particle to the multivalent metal salt is preferably from 10.0 percent by mass or less, more preferably 4.0 percent by mass or less, and furthermore preferably 3.0 percent by mass or less. In the liquid composition, the mass ratio of the inorganic particle to the multivalent metal salt is preferably from 0.5 percent by mass or greater, more preferably 1.0 percent by mass or greater, and furthermore preferably 1.5 percent by mass or greater. Within this range, it is possible to reduce adhesion of the liquid composition to a member when the member contacts an area of a recording medium where the liquid composition is applied but the ink is not applied yet. In addition, within this range, the effect of aggregation of the pigment ascribable to the multivalent metal salt is enhanced, and beading of the image can be reduced.

Organic Solvent

The liquid composition may contain an organic solvent and using a water-soluble organic solvent is preferable. Examples of the water-soluble organic solvent are polyols, ethers such as polyol alkylethers and polyol arylethers, nitrogen-containing heterocyclic compounds, amides, amines, and sulfur-containing compounds.

Specific examples of the water-soluble organic solvent include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate. Of these, it is preferable to use glycerin, in which the multivalent metal salt is highly soluble, and more preferable to use glycerin alone.

The proportion of the organic solvent in the liquid composition has no particular limit and can be suitably selected to suit to a particular application.

In terms of drying property of the liquid composition, the proportion is preferably from 10 to 60 percent by mass and more preferably from 20 to 60 percent by mass.

Water

As the water, for example, pure water and ultra pure water such as deionized water, ultrafiltered water, reverse osmosis water, and distilled water are suitable. These can be used alone or in combination. The proportion of the water to the total amount of the liquid composition is preferably 65 percent by mass or less and more preferably from 30 to 50 percent by mass. When the amount is 65 percent by mass or less, it is possible to reduce viscosity increase of the liquid composition, gelation, and precipitation of insoluble material at water evaporation.

Surfactant

Surfactants decrease the surface tension of the liquid composition and improve wettability thereof to various recording media, which makes it possible to uniformly apply the liquid composition. The surfactant suitably makes the liquid composition wettable, thereby increasing the penetration speed for various recording media.

In particular, permeation of the liquid composition into various recording media is considered with an emphasis. If the liquid composition does not easily permeates, the liquid composition tends to pool around the surface of the recording medium. This pooled liquid composition is brought into contact with an ink and causes the coloring material therein to excessively agglomerate. This may decrease the dot diameter, resulting in occurrence of insufficient filling of the image. In addition, this coloring material excessively accumulating on the surface of the recording medium may have an adverse impact on fixability.

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application. Of these, silicone-based surfactants not decomposed even in high pH environment are preferable. The silicone-based surfactants include, for example, side chain-modified polydimethyl siloxane, both distal end-modified polydimethyl siloxane, one distal end-modified polydimethyl siloxane, and side chain both distal end-modified polydimethyl siloxane. As the modification group, it is particularly preferable to select a polyoxyethylene group or polyoxyethylene polyoxypropylene group because these demonstrate good properties as aqueous surfactants. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not easily produce foams.

Specific examples of the perfluoroalkyl sulfonic acid compounds include, but are not limited to, a perfluoroalkyl sulfonic acid and a salt of perfluoroalkyl sulfonic acid. Specific examples of the perfluoroalkyl carboxylic acid compounds include, but are not limited to, a perfluoroalkyl carboxylic acid and a salt of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application. Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Toray Co., Ltd, NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

[Chem. S-1]

Chemical formula S-1

In the Chemical formula S-1, "m", "n", "a", and "b" each, respectively independently represent integers, R represents an alkylene group, and R' represents an alkyl group. Specific examples of polyether-modified silicone-based surfactants include, but are not limited to, KF-618, KF-642, and KF-643 (all manufactured by Shin-Etsu Chemical Co., Ltd.), EMA-LEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Toshiba Silicone Co. Ltd.).

The fluorochemical surfactant is preferably a compound having 2 to 16 fluorine-substituted carbon atoms and more preferably a compound having 4 to 16 fluorine-substituted carbon atoms.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in the side chain thereof are preferable because these polymer compounds not foam easily and the fluorosurfactant represented by the following Chemical formula F-1 or Chemical formula F-2 is more preferable.

Chemical formula F-1

In the compound represented by Chemical formula F-1, m is preferably 0 or an integer of from 1 to 10 and n is preferably 0 or an integer of from 1 to 40.

Chemical formula F-2

In the compound represented by the chemical formula F-2, Y represents H or $C_mF_{2m+1}$, where m represents an integer of from 1 to 6, or $CH_2CH(OH)CH_2$—$C_mF_{2m+1}$, where m represents an integer of from 4 to 6, or $C_pH_{2p+1}$, where p is an integer of from 1 to 19. "n" represents an integer of from 1 to 6. "a" represents an integer of from 4 to 14. As the fluorochemical surfactant, products available on the market may be used. Specific examples include, but are not limited to, SURFLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE DSN-403N (manufactured by DAIKIN INDUSTRIES, Ltd.). Of these, FS-3100, FS-34, and FS-300 of The Chemours Company, FT-110, FT-250, FT-251, FT-4005, FT-150, and FT-400SW of NEOS COMPANY LIMITED, POLYFOX PF-151N of OMNOVA SOLUTIONS INC., and UNIDYNE DSN-403N (manufactured by DAIKIN INDUSTRIES, Ltd.) are particularly preferable.

The proportion of the surfactant in the liquid composition is not particularly limited and can be suitably selected to suit to a particular application. For example, it is preferably from 0.001 to 5 percent by mass and more preferably from 0.05 to 5 percent by mass.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to not lower than 7. Specific examples include, but are not limited to, amines such as diethanol amine and triethanol amine.

Properties of Liquid Composition

Properties of the liquid composition are not particularly limited and can be suitably selected to suit to a particular application. For example, viscosity, surface tension, and pH are preferably in the following ranges.

Viscosity of the liquid composition at 25 degrees C. is preferably from 5 to 30 mPa s, and more preferably from 5 to 25 mP s. Viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Rotational frequency: 50 rotations per minute (rpm)
25 degrees C.
Measuring time: three minutes Surface tension of the liquid is preferably 35 mN/m or less and more preferably 32 mN/m or less at 25 degrees C.

pH of the liquid composition is preferably from 7 to 12 and more preferably from 8 to 11 in terms of prevention of corrosion of metal materials in contact with the liquid composition.

Tacking Force

For cast-coated paper at 23 degrees C. and 65 percent humidity, the liquid composition is applied thereto in an amount of $0.12$ mg/cm$^2$, followed by heating at 80 degrees C. for 15 seconds. The area of the cast-coated paper to which the liquid composition is applied has a tacking force of 50 mN or less, preferably 46 mN or less, more preferably 40 mN or less, furthermore preferably 36 mN or less, and particularly preferably 33 mN or less. In addition, a lower tacking force is preferable. However, for example, the tacking force can be 20 mN or greater. Within this tacking force range of 50 mN or less, it is possible to reduce adhesion of the liquid composition to a member when the member contacts the area of a recording medium where the liquid composition is applied but the ink is not applied yet.

To measure the tacking force, a tacking tester (TAC-II, manufactured by RHESCA Co., LTD.) can be used. The cast-coated paper is a kind of recording media and has a cast-coating layer. The recording medium having a cast-coating layer is prepared by applying a paint to paper and thereafter heated and dried by a smooth and gloss chrome plated cast drum. Specific examples of the cast-coated paper available on the market include, but are not limited to, Miller Coat Gold, Miller Coat Platinum, Double Sided Chrome Color, Esprit Coat C, Esprit Coat FP, and Esprit Coat W. In this embodiment, Esprit C 157 g/m$^2$ (manufactured by Nippon Paper Industries Co., Ltd.) is used to measure the tacking force.

There is no specific limit to the method of causing the tacking force to be 50 mN or less. Examples include a method of controlling the content of an inorganic particle in a liquid composition and a method of controlling the mass ratio of the content of an inorganic particle and the content of a multivalent metal salt in a liquid composition. Also, as an option included in those methods, controlling the kind and the content of a surfactant can be added. These can be used alone or as a mixture of two or more.

Ink

The ink in the present embodiment is applied to the area to which the liquid composition is already applied. The ink contains an organic solvent, water, a coloring material, a resin, and other optional components such as a surfactant to suit to a particular application.

As for the organic solvent, water, and the other components such as a surfactant, the description thereof is omitted because the same components as those for the liquid composition can be used.

Coloring Material

The coloring material has no particular limit. For example, pigments and dyes are suitable.

As the pigment, inorganic pigments or organic pigments can be used. These can be used alone or in combination. In addition, it is possible to use a mixed crystal as the pigment.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to 15 percent by mass and more preferably from 1 to 10 percent by mass in terms of enhancement of image density, fixability, and discharging stability.

To obtain an ink by dispersing a pigment, for example, a hydrophilic functional group is introduced into a pigment to prepare a self-dispersible pigment, the surface of a pigment is coated with a resin followed by dispersion, or a dispersant is used to disperse a pigment.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of a pigment with a resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and an organic solvent. It is also possible to mix the pigment with water, a dispersant, etc., to prepare a pigment dispersion and thereafter mix the pigment dispersion with material such as water and an organic solvent to manufacture the ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and increasing image density, the proportion is preferably from 0.1 to 50 percent by mass and more preferably from 0.1 to 30 percent by mass.

It is preferable that the pigment dispersion be filtered with a filter, a centrifuge, etc. to remove coarse particles followed by degassing.

Resin

The type of the resin contained in the ink has no particular limit and can be suitably selected to suit to a particular application. Examples are urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Resin particles made of such resins can be also used. It is possible to mix a resin emulsion in which the resin particles are dispersed in water as a dispersion medium with materials such as a coloring material and an organic solvent to obtain an ink. It is possible to use a suitably-synthesized resin particle. Alternatively, the resin particle is available on the market. These resin particles can be used alone or in combination.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using, for example, a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably from 1 to 30 percent by mass and more preferably from 5 to 20 percent by mass to the total amount of the ink.

The particle diameter of the solid portion in the ink has no particular limit and can be selected to suit to a particular application. The maximum frequency of the particle diameter of the solid portion in the ink is preferably from 20 to 1000 nm and more preferably from 20 to 150 nm in the maximum number conversion to enhance discharging stability and image quality such as image density. The solid portion includes resin particles, particles of pigments, etc. The particle diameter can be measured by using a particle size analyzer (Nanotrac Wave-UT151, manufactured by MicrotracBEL Corp).

Property of Ink

Properties of the ink are not particularly limited and can be suitably selected to suit to a particular application. For example, viscosity, surface tension, and pH are preferably in the following ranges.

Viscosity of the ink at 25 degrees C. is preferably from 5 to 30 mPa s and more preferably from 5 to 25 mPa s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Rotational frequency: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably leveled on a recording medium and the drying time of the ink is shortened. In addition, when the ink is used in combination with the liquid composition of the present embodiment, the ink preferably has a surface tension of 32 mN/m or less and more preferably 25 mN/m or less at 25 degrees C. to suitably reduce beading.

pH of the ink is preferably from 7 to 12 and more preferably from 8 to 11 in terms of prevention of corrosion of metal material in contact with liquid.

Recording Medium

As the recording medium, it is possible to use without a particular limitation. For example, plain paper, glossy paper, special paper, and cloth can be used. Also, a low-permeable substrate (also referred to as a low-absorptive recording medium or a low-absorptive substrate) can be particularly suitably used.

The low-permeable substrate has a surface with low moisture permeability, absorbency, and/or adsorption property and includes a material having myriad of hollow spaces inside but not open to the exterior. Examples of the low-permeable substrate are coated paper for use in commercial printing and a recording medium like coated paper board having a middle layer and a back layer mixed with waste paper pulp. When a member such as a roller contacts an area of such a low-permeable recording medium where the liquid composition is applied but the ink is not applied yet, the liquid composition easily adheres to the member. Therefore, it is preferable to use the liquid composition of embodiments of the present disclosure for a low-absorptive recording medium because it is possible to reduce adhesion of the liquid composition to the member.

Low-Permeable Substrate

The low-permeable substrate includes, for example, a substrate and a surface layer provided to at least one surface of the substrate. Also, the low-permeable substrate includes a recording medium such as coated paper having other optional layers.

The recording medium including the substrate and the surface layer preferably has a transfer amount of pure water to the recording medium of from 2 to 35 mL/m$^2$ and more preferably from 2 to 10 mL/m$^2$ during a contact time of 100 ms as measured by a liquid dynamic absorptomitor.

When the transfer amount of the ink and pure water during a contact time of 100 ms is too small, beading tends to occur. When the transfer amount is too large, the ink dot diameter tends to be smaller than desired after image forming.

The transfer amount of pure water to the recording medium is from 3 to 40 mL/m$^2$ and preferably from 3 to 10 mL/m$^2$ during a contact time of 400 m as measured by a liquid dynamic absorption tester.

When the transfer amount during the contact time of 400 ms is small, drying property becomes insufficient. When the transfer amount is too much, gloss of the image portion tends to be low after drying. The transfer amount of pure water to the recording medium during a contact time of 100 ms and 400 ms can be measured at the surface on which the surface layer is provided in both transfer amounts.

This dynamic scanning absorptometer (KUGA, Shigenori, Dynamic scanning absorptometer (DSA); Journal of JAPAN TAPPI, published in May 1994, Vol. 48, pp. 88-92) can accurately measure the liquid amount absorbed in an extremely small period of time. This dynamic scanning absorptometer automates the measuring utilizing the method of directly reading the absorption speed of liquid from moving of meniscus in a capillary, spirally scanning an imbibition head on a sample having a disc-like form, and measuring the required number of points on the single sample while automatically changing the scanning speed according to predetermined patterns.

The liquid supply head to a paper sample is connected with the capillary via a TEFLON tube and the position of the meniscus in the capillary is automatically read by an optical sensor. Specifically, the transfer amount of pure water or ink can be measured using a dynamic scanning absorptometer (K350 Series D type, manufactured by Kyowa Seiko Inc.).

Each of the transfer amount during the contact time of 100 ms and 400 ms can be obtained by interpolation from the measuring results of the transfer amount in the proximity contact time of the contact time.

Substrate

There is no specific limitation to the selection of the substrate and it can be suitably selected to suit to a particular application. For example, paper mainly formed of wood fiber and a sheet material such as non-woven cloth mainly formed of wood fiber and synthesized fiber are usable.

There is no specific limit to the thickness of the substrate. The layer thickness thereof can be determined and preferably ranges from 50 to 300 μm. The weight of the substrate is preferably from 45 to 290 g/m$^2$.

Surface Layer

The surface layer contains a pigment, a binder, and other components such as a surfactant.

As the pigments, inorganic pigments or a combination of inorganic pigments and organic pigments can be used. Specific examples of the inorganic pigments include, but are not limited to, kaolin, talc, heavy calcium carbonate, light calcium carbonate, calcium sulfite, amorphous silica, titanium white, magnesium carbonate, titanium dioxide, aluminum hydroxide, calcium hydroxide, magnesium hydroxide, zinc hydroxide, and chlorite. The addition amount of the inorganic pigment is preferably 50 parts by mass or more based on 100 parts by mass of the binder.

Specific examples of the organic pigments include, but are not limited to, water-soluble dispersions of styrene-acrylic copolymer particles, styrene-butadien copolymer particles, polystyrene particles, and polyethylene particles. The addition amount of the organic pigment is preferably from 2 to 20 parts by mass based on 100 parts by mass of all the pigments in the surface layer.

As the binder resin, aqueous resins are preferable. As the aqueous resins, at least one of water-soluble resins and water-dispersible resins are preferable. The water-soluble resin is not particularly limited and can be suitably selected to suit to a particular application. Examples thereof include polyvinyl alcohol, cation-modified polyvinyl alcohol, acetal-modified polyvinyl alcohol, polyester, and polyurethane.

The surfactant optionally contained in the surface layer is not particularly limited and can be suitably selected to suit to a particular application. Anionic active agents, cationic active agents, amphoteric active agents, and non-ionic active agent can be used.

The method of forming the surface layer is not particularly limited and can be suitably selected to suit to a particular application. For example, methods are utilized in which liquid forming the surface layer on a substrate is applied to the substrate or a substrate is immersed in the liquid constituting the surface layer. The attachment amount of the liquid forming the surface layer is not particularly limited and can be suitably selected to suit to a particular application. The attachment amount of the solid portion is preferably ranges from 0.5 to 20 g/m² and more preferably from 1 to 15 g/m².

Image Forming Method

The image forming method preferably includes applying the above-mentioned liquid composition to a recording medium and applying an ink to the area where the liquid composition has been applied.

Liquid Composition Application

The liquid composition is applied to a recording medium utilizing a liquid discharging method and an application method.

The liquid discharging method is not particularly limited and can be suitably selected to suit to a particular application. For example, a method using a piezoelectric element actuator, a method of applying a thermal energy, a method using an actuator utilizing an electrostatic force, and a method of a continuous jetting type charging control type head.

Specific examples of such an application method include, but are not limited to, a blade coating method, a gravure coating method, a gravure offset coating method, a bar coating method, a roll coating method, a knife coating method, an air knife coating method, a comma coating method, a U comma coating method, an AKKU coating method, a smoothing coating method, a micro gravure coating method, a reverse roll coating method, a four or five roll coating method, a dip coating method, a curtain coating method, a slide coating method, and a die coating method. Of these, the wire bar coating method and the roll coating method are particularly preferable.

In the liquid composition application, the application amount of the liquid composition to a recording medium is preferably from 0.1 to 30.0 g/m², and more preferably from 0.2 to 10.0 g/m². When the application amount is 0.1 g/m² or more, the image quality can be improved. When the application amount is 30.0 g/m² or less, drying properties of the liquid composition can be improved and curling can be prevented in particular for a low-absorptive recording medium.

The recording medium to which the liquid composition is applied in the liquid composition application may furthermore optionally be subjecterd to heating to dry the liquid composition after the liquid composition application and before ink application, which is described later. However, this heating can be omitted.

The recording medium can be heated by a known heating device such as a roll heater, a drum heater, and heated wind to dry the liquid composition applied to the recording medium. The recording medium is heated to 60 degrees C. or higher by such a heating device.

Ink Application

The ink is applied to the recording medium after the liquid composition is applied thereto. In addition, the ink is applied to the area of the recording medium to which the liquid composition is applied.

Specific examples of the method of applying the ink to a recording medium include, but are not limited to, inkjet methods, blade coating methods, gravure coating methods, bar coating methods, roll coating methods, dip coating methods, curtain coating methods, slide coating methods, die coating methods, and spray coating methods. Of these, the inkjet method is preferable.

Image Forming Device

The image forming device preferably includes a liquid composition accommodating device accommodating the liquid composition, a liquid composition applying device to apply the accommodated liquid composition to a recording medium, and an ink applying device to apply an ink to the area to which the liquid composition has been applied.

Figure 2:
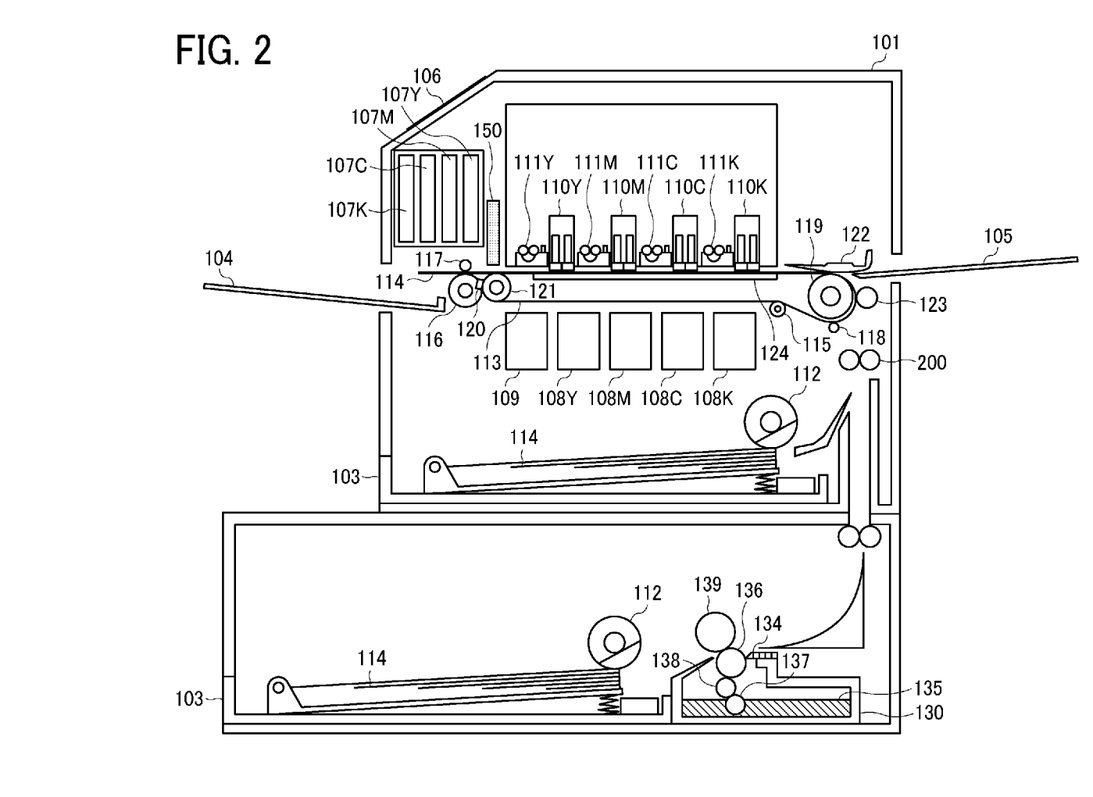
FIG. 2 is a schematic diagram illustrating an example of the image forming device.

An embodiment of the image forming device is described with reference to FIG. 2. FIG. 2 is a schematic diagram illustrating an example of the image forming device.

An image forming device 101 illustrated in FIG. 2 includes multiple head units of 110K, 110C, 110M, and 110Y each of which includes heads to discharge an ink as an example of the ink applying device, multiple maintenance units of 111K, 111C, 111M, and 111Y corresponding to respective head units to maintain the heads, multiple ink cartridges of 107K, 107C, 107M, and 107Y to accommodate and supply the ink as an example of an ink accommodating device, and multiple sub ink tanks of 108K, 108C, 108M, and 108Y to partially accommodate the ink supplied from the respective ink cartridges and supply the ink to the respective heads with a suitable pressure.

In addition, the image forming device 101 includes a conveyor belt 113 to convey a recording medium 114 while adsorbing the recording medium 114 by a suction fan 120, conveyor rollers 119 and 121 supporting the conveyor belt 113, a tension roller 115 to control such that the conveyor belt 113 keeps a suitable tension, a platen 124 and a platen roller 118 to cause the conveyor belt 113 to keep a suitable plane property, a charging roller 116 to apply electrostatic charges to adsorb the recording medium 114, an ejecting roller 117 to press the recording medium 114, an ejecting assembly including an ejection tray 104 to store the ejected recording medium 114, a feeder tray 103 to store the recording medium 114 to form an image thereon, separating pads 112 and 122 to feed the recording medium 114 from the feeder tray 103 one piece by one piece, a counter roller 123 to cause a charging belt to securely adsorb the fed recording medium 114, and a bypass tray 105 for use in a case in which the recording medium 114 is manually fed.

In addition, the image forming device 101 further includes a waste liquid tank 109 to retrieve waste liquid ejected after maintenance and an operation panel 106 from which the device is operated and on which the status of the device is displayed.

The nozzle lines of each head unit of 110K, 110C, 110M, and 110Y are disposed along the direction vertical to the conveyance direction of the recording medium 114 and extends longer than the recording area.

The recording medium 114 is separated from the feeder tray 103 by a separation roller one piece by one piece, caused to adhere to the conveyor belt 113 by a pressurizing roller, and fixed on the conveyor belt 113. Thereafter, liquid droplets are discharged onto the recording medium 114 when the recording medium 114 is passing under the head units of 110K, 110C, 110M, and 110Y, thereby forming an image. The image is a collective form of dots formed by the liquid droplets. After the recording medium 114 is separated by a separation claw, the recording medium 114 is ejected to the ejection tray 104 while being supported by the ejection roller 117.

Furthermore, the image forming device 101 illustrated in FIG. 2 includes an application assembly 130, which is an example of a device for applying the liquid composition having an assembly to process the surface of the recording medium 114 with the liquid composition. The application assembly 130 employs a roller application assembly. The liquid composition is accommodated in a liquid composition accommodating tank 135 as an example of the liquid composition accommodating device, drawn to the surface of a drawing roller 137 by the drawing roller 137, and transferred to a film-pressure control roller 138. Thereafter, the liquid composition transferred to an application roller 136 as an example of the liquid composition applying device is transferred and applied to the recording medium 114 passing through between the application roller 136 and a counter roller 139 for application. Notably, the device for applying the liquid composition includes at least a liquid composition applying device and may be a single independent device, integrated with another device, or incorporated and integrated in an image forming device.

The application amount of the liquid composition to be transferred to the application roller 136 is determined by controlling the thickness of nipping with the application roller 136. If not to apply the liquid composition, a movable blade 134 is pressed against the application roller 136 to wipe off the liquid composition from the surface of the application roller 136 to a degree that the liquid composition does not remain on the application roller 136. This obviates the risk of thickening ascribable to drying of the liquid composition, fixation of the liquid composition on the counter roller 139 for application, and malfunction such as uneven application, which stem from the liquid composition remaining on the application roller 136.

In addition, as illustrated in FIG. 2, two of the feeder units can be separately disposed along the straight up and down. In such a case, the feeder unit disposed on the lower part is used when applying the liquid composition while the feeder unit disposed on the upper part is used when not applying the liquid composition.

In addition to the roller application method, it is also possible to apply the liquid composition by a discharging method such as spraying. For example, a head like the head 110K can be filled with the liquid composition and discharge the liquid composition to the recording medium 114 like the ink. Also, the discharging amount and the discharging position can be easily controlled with high precision. In addition, it is also possible to use the roller application method and the spray application method in combination.

The liquid composition can be applied to any position in any amount by an either method.

In addition, the image forming device 101 of the present embodiment includes a roller 200 as an example of the member directly contacting the area to which the liquid composition is applied. The roller 200 is disposed between the position where the application roller 136 is disposed and the head units of 110K, 110C, 110M, and 110Y in the conveyance path of the recording medium 114. The roller 200 is used to convey the recording medium 114 and may also include a heating device to heat the liquid composition applied to the recording medium 114 to dry the liquid composition. In this embodiment, adhesion of the liquid composition to the roller 200 can be reduced even with such a device configuration.

Moreover, a heated wind blowing fan 150 heats the recording medium 114 to which the liquid composition and the ink are attached to accelerate drying, thereby improving fixability. In the present embodiment, the heated wind blowing fan 150 is used to dry the recording medium 114 after printing in the heating process. However, the recording medium 114 can be heated before printing as well as after printing. In addition, a heating roller can be used instead of the heated wind blowing fan 150.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Synthesis Example of Copolymer A 550 g of methylethyl ketone was loaded in the reaction container of an automatic polymerization reactor (polymerization tester DSL-2AS type, available from TODOROKI SANGYO CO., LTD.) equipped with a stirrer, a dripping instrument, a temperature sensor, and a reflux instrument equipped with a nitrogen gas introducing device at its upper part, and the inside of the reaction container was replaced with nitrogen during stirring. Maintaining the inside of the reaction container in nitrogen atmosphere, the system was heated to 80 degrees C. Thereafter, a liquid mixture of 75.0 g of methacrylic acid-2-hydroxyethyl, 77.0 g of methacrylic acid, 80.0 g of styrene, 150.0 g of butylmethacrylate, 98.0 g of butylacrylate, 20.0 g of methylmethacrylate, and 40.0 g of PERBUTYL 0 (manufactured by NOF CORPORATION) was dripped to the reaction container in four hours by the dripping instrument. After dripping, the system was allowed to continue reaction at the same temperature for 15 hours to obtain a methylethyl ketone solution of styrene having an anionic functional group-acrylic-based copolymer A having an acid value of 100, a weight average molecular weight of 21,000, and a glass transition temperature (Tg, calculated) of 31 degrees C. After the completion of the reaction, methylethyl ketone was partially distilled away with a reduced pressure to obtain Copolymer A solution in which the non-volatile portion was adjusted to 50 percent.

Preparation Example of Pigment Dispersion

Preparation of Pigment Dispersion 1

1,000 g of carbon black (Raven 1080, available from Colombian Carbon Japan Co.), 800 g of the Copolymer A solution, 143 g of 10 percent sodium hydroxide aqueous solution, 100 g of methylethyl ketone, and 1,957 g of water were loaded in a mixing tank equipped with a jacket for cooling and stirred and mixed. The liquid mixture was dispersed by a dispersion device (SC mill SC100, manufactured by Mitsui Mining Company) filled with zirconia beads having a diameter of 0.3 mm for six hours in a circulation manner (liquid dispersion out of the dispersion device returned to the mixing tank). The number of rotation of the dispersion device was 2,700 rotation per minute (rpm), and cold water was caused to pass through the jacket for cooling to keep the temperature of the liquid dispersion at 40 degrees C. or lower. After the completion of dispersion, raw liquid dispersion was extracted from the mixing tank, and the mixing tank and the flow paths in the dispersion device were rinsed with 10,000 g of water. The liquid after rinsing and the raw liquid dispersion were mixed to obtain a diluted liquid dispersion. The diluted liquid dispersion was placed in a glass distillator to distill away all of methylethyl ketone and a part of water. After the system was cooled down to room temperature, 10 percent hydrochloric acid was dripped to the distillator to control pH to 4.5 during stirring. Thereafter, the solid portion was filtrated and rinsed with water by Nutsche filtration equipment (pressure filtration equipment, manufactured by Japan Chemical Engineering & Machinery Co, Ltd.). The thus-obtained cake was taken to a vessel and 200 g of 20 percent potassium hydroxide aqueous solution was added thereto. Thereafter, the resultant was dispersed by a dispersion device (TK homodisper, manufactured by PRI-MIX Corporation). Moreover, water was added thereto to adjust the non-volatile portion to obtain Pigment dispersion 1, which was dispersed in an aqueous medium as a complex particle in which carbon black having a non-volatile portion in an amount of 20 percent by mass was covered with a styrene-acrylic-based copolymer having a carboxyl group neutralized in potassium hydroxide.

Preparation Example of Ink

Preparation of Ink 1

22.0 percent by mass glycerin, 11.0 percent by mass 1,3-butane diol, 2.0 percent by mass 1,3-octane diol, 2.0 percent by mass surfactant (E1010, manufactured by Nisshin Chemical Co., Ltd.), 1.1 percent by mass 2,4,7,9-tetramethyldecane-4,7-diol, 0.1 percent by mass PROXEL LV (manufactured by AVECIA GROUP), 0.5 percent by mass 2-amino-2-ethyl-1,3-propanediol, and deionized water were uniformly mixed by stirring for one hour. Thereafter, 2.0 percent by mass rosin-modified maleic acid resin (Harimac R-100, manufactured by Harima Chemicals, Inc.) was added thereto followed by uniform mixing by stirring for one hour. Thereafter, Pigment dispersion 1 was added in such a manner that the solid mass was 8.0 percent by mass followed by uniform mixing by stirring for one hour. The thus-obtained mixture was pressure-filtrated with a polyvinilydene fluoride membrane filter having an average opening diameter of 0.8 μm to remove coarse particles and dust to obtain ink 1.

The static surface tension of the obtained Ink 1 was measured at 23 degrees C. and 55 percent RH using a Wilhelmy type surface tension meter (CBVP-Z, manufactured by Kyowa Interface Science Co., Ltd.) and found to be 22 mN/m.

Preparation of Ink 2

Ink 2 was obtained in the same manner as in Preparation of Ink 1 except that the composition was changed to those shown in Table 1. Also, the static surface tension was measured in the same manner as for Ink 1, and it was 35 mN/m. The values in Table 1 are represented in percent by mass. Ba* in Tables means balance.

TABLE 1

| | Ink | 1 | 2 |
|---|---|---|---|
| Organic solvent | Glycerin | 22.0 | 22.0 |
| | 1,3-Butane diol | 11.0 | 11.0 |
| | 1,3-Octane diol | 2.0 | 2.0 |
| Coloring material | Aqueous pigment dispersion 1 (solid mass) | 8.0 | 8.0 |
| | Aqueous pigment dispersion 2 (solid mass) | — | — |
| Resin | Rosin-modified maleic acid Halimac R-100 (manufactured by Harima Chemicals, Inc.) | 2.0 | 2.0 |
| Surfactant | E1010 (manufactured by Nisshin Chemical Industry Co., Ltd.) | 2.0 | 0.8 |

TABLE 1-continued

| | Ink | 1 | 2 |
|---|---|---|---|
| Foam inhibitor | 2,4,7,9-tetramethyldecane-4,7-diol | 1.1 | 1.1 |
| Antibacterial Agent | PROXEL LV | 0.1 | 0.1 |
| pH regulator | 2-amino-2-ethyl-1,3-propane diol | 0.5 | 0.5 |
| Water | Deionized water | Balance | Balance |
| | Total | 100.0 | 100.0 |
| | Static surface tension (mN/m) | 22 | 35 |

Example 1

Preparation of Liquid Composition 30.0 percent by mass glycerin, 25.0 percent by mass magnesium sulfate heptahydrate (manufactured by Showa Chemical Industry Co., Ltd.), 0.4 percent by mass polyoxyalkylene alkyl ether (EMULGEN 103, manufactured by Kao Corporation), 0.1 percent by mass Proxel LV (manufactured by Avecia Ltd.), 0.1 percent by mass benzo-triazole, and 0.5 percent by mass titanium oxide particle (manufactured by Titan Kogyo, Ltd.) were added and uniformly mixed by stirred for one hour. Further, 1.2 percent by mass N-octyl-2-pyrolidone was added. Thereafter, deionized water was added to make the total 100 percent by mass, followed by stirring for one hour to obtain a homogeneous mixture of Liquid composition 1 of Example 1.

Next, the tacking force of the prepared Liquid composition 1 was measured. For Esprit C 157 g/m$^2$ (cast coated paper manufactured by Nippon Paper Group Co., Ltd.), the liquid composition 1 was applied in an amount of 0.12 mg/cm$^2$ under an environment of 23 degrees C. and a humidity of 65 percent using a bar coater. Thereafter, the liquid composition 1 on the cast coated paper was heated at 80 degrees C. for 15 seconds to measure the tacking force thereof. To measure the tacking force, a tacking tester (TAC-II, manufactured by RHESCA Co., LTD.) was used. The results are shown in Table 2. Notably, the liquid composition having a tacking force of 50 mN or less is practically usable.

Examples 2 to 9 and Comparative Examples 1 and 2

Preparation of Liquid Compositions 2 to 11

Liquid compositions 2 to 9 of Examples 2 to 9 and Liquid compositions 10 and 11 of Comparative Examples 1 and 2 were obtained in the same manner as in the preparation of Liquid composition 1 except that the composition was changed to those shown in the following Table 2. The values of the compositions shown in Table 2 are represented in percent by mass.

In addition, the tacking force of the liquid compositions 2 to 9 of Examples 2 to 9 and the liquid compositions 10 and 11 of Comparative Examples 1 and 2 were measured in the same manner as for Liquid composition 1. The results are shown in Table 2.

TABLE 2

| | | Example | | | | | |
|---|---|---|---|---|---|---|---|
| | | 1 | 2 | 3 | 4 | 5 | 6 |
| | Liquid composition | 1 | 2 | 3 | 4 | 5 | 6 |
| Organic solvent | Glycerin | 30.0 | 30.0 | 30.0 | 30.0 | 30.0 | 30.0 |
| Multivalent metal salt | Magnesium sulfate heptahydrate | 25.0 | 25.0 | 25.0 | 25.0 | 25.0 | 25.0 |
| Surfactant | Polyoxyalkylene alkyl ether | 0.4 | 0.4 | 0.4 | 0.4 | 0.4 | 0.4 |
| Foam inhibitor | N-Octyl-2-pyrroridone | 1.2 | 1.2 | 1.2 | 1.2 | 1.2 | 1.2 |
| Antibacterial Agent | PROXEL LV | 0.1 | 0.1 | 0.1 | 0.1 | 0.1 | 0.1 |
| Corrosion Inhibitor | Benzotriazoles | 0.1 | 0.1 | 0.1 | 0.1 | 0.1 | 0.1 |
| Inorganic particle | Titanium oxide | 0.5 | — | — | — | — | 1.0 |
| | Aluminum oxide | — | 0.5 | — | — | — | — |
| | Silicon oxide | — | — | 0.5 | — | — | — |
| | Zinc oxide | — | — | — | 0.5 | — | — |
| | Zinc peroxide | — | — | — | — | 0.5 | — |
| Water | Deionized water | Ba* | Ba* | Ba* | Ba* | Ba* | Ba* |
| | Total | 100.0 | 100.0 | 100.0 | 100.0 | 100.0 | 100.0 |
| | Concentration (mol/kg) of multivalent metal salt | 1.0 | 1.0 | 1.0 | 1.0 | 1.0 | 1.0 |
| | Glycerin/multivalent racial salt | 1.2 | 1.2 | 1.2 | 1.2 | 1.2 | 1.2 |
| | Inorganic particle/multivalent metal salt | 2.0 | 2.0 | 2.0 | 2.0 | 2.0 | 4.0 |
| | Tacking force (mN) | 45 | 47 | 46 | 44 | 47 | 36 |

| | | Example | | | Comparative Example | |
|---|---|---|---|---|---|---|
| | | 7 | 8 | 9 | 1 | 2 |
| | Liquid composition | 7 | 8 | 9 | 10 | 11 |
| Organic solvent | Glycerin | 30.0 | 30.0 | 30.0 | 30.0 | 30.0 |
| Multivalent metal salt | Magnesium sulfate heptahydrate | 25.0 | 25.0 | 25.0 | 25.0 | 25.0 |
| Surfactant | Polyoxyalkylene alkyl ether | 0.4 | 0.4 | 1.2 | 0.4 | 0.4 |
| Foam inhibitor | N-Octyl-2-pyrroridone | 1.2 | 1.2 | 1.2 | 1.2 | 1.2 |
| Antibacterial Agent | PROXEL LV | 0.1 | 0.1 | 0.1 | 0.1 | 0.1 |
| Corrosion Inhibitor | Benzotriazoles | 0.1 | 0.1 | 0.1 | 0.1 | 0.1 |
| Inorganic particle | Titanium oxide | 1.1 | 0.8 | 0.1 | — | 0.1 |
| | Aluminum oxide | — | — | — | — | — |
| | Silicon oxide | — | — | — | — | — |
| | Zinc oxide | — | — | — | — | — |
| | Zinc peroxide | — | — | — | — | — |
| Water | Deionized water | Ba* | Ba* | Ba* | Ba* | Ba* |
| | Total | 100.0 | 100.0 | 100.0 | 100.0 | 100.0 |
| | Concentration (mol/kg) of multivalent metal salt | 1.0 | 1.0 | 1.0 | 1.0 | 1.0 |
| | Glycerin/multivalent metal salt | 1.2 | 1.2 | 1.2 | 1.2 | 1.2 |
| | Inorganic particle/multivalent metal salt | 4.4 | 3.0 | 0.2 | — | 0.2 |
| | Tacking force (mN) | 40 | 33 | 50 | 250 | 55 |

The product names and the manufacturing companies of the ingredients shown in Table 2 are as follows:

Aluminium oxide (manufactured by Wako Pure Chemical Industries, Ltd.)

Silicon oxide (manufactured by Wako Pure Chemical Industries, Ltd.)

Zinc oxide (manufactured by Wako Pure Chemical Industries, Ltd.)

Zinc peroxide (manufactured by Wako Pure Chemical Industries, Ltd.)

Adhesion of Liquid Composition

Adhesion of Liquid compositions 1 to 11 prepared in Examples 1 to 9 and Comparative Examples 1 and 2 was evaluated. For Esprit C 157 g/m² (cast coated paper manufactured by Nippon Paper Group Co., Ltd.), each of the liquid compositions was applied in an amount of 0.12 mg/cm² under an environment of 23 degrees C. and a humidity of 65 percent using a bar coater. Thereafter, each of the liquid compositions on the cast coated paper was heated at 80 degrees C. for 15 seconds. Next, an aluminum metal plate was pressed at 100 kgf/m² against the area of the cast-coated paper to which the liquid composition was applied. Thereafter, adhesion of the liquid composition for the metal plate liquid composition was evaluated based on the following evaluation criteria. The results are shown in Table 3. B and above in the following evaluation criteria were determined as practically usable.

Evaluation Criteria
A: No adhesion
B: Adhesion at one site
C: Adhesion at two or more sites

TABLE 3

|  | Example | | | | | | | | | Comparative Example | |
|---|---|---|---|---|---|---|---|---|---|---|---|
|  | 1 | 2 | 3 | 4 | 5 | 6 | 7 | 8 | 9 | 1 | 2 |
| Adhesion of liquid composition | B | B | B | B | B | A | A | A | B | C | C |

Beading Property

Beading property of the images formed using the inks 1 and 2 prepared above and the liquid compositions 1 to 11 prepared above in Examples 1 to 9 and Comparative Examples 1 and 2 was evaluated as follows: For Esprit C 157 g/m² (cast coated paper manufactured by Nippon Paper Group Co., Ltd.), each of the liquid compositions was applied in an amount of 0.12 mg/cm² under an environment of 23 degrees C. and a humidity of 65 percent using a bar coater. Thereafter, each of the liquid compositions on the cast coated paper was heated at 80 degrees C. for 15 seconds. Next, a solid image was printed on the area of the recording medium to which the liquid composition was applied by filling an ink jet printer (IPSiO GXe 5500, manufactured by Ricoh Company, Ltd.) with each of the ink prepared above and heated and dried at 80 degrees C. for two minutes. The density unevenness (beading) of the solid image was observed with an optical microscope with a magnifying power of 40× and evaluated based on the following evaluation criteria. The results are shown in Table 4. B and above in the following evaluation criteria were determined as practically usable.

Evaluation Criteria
A: Beading was not observed
B: Beading was slightly observed
C: Beading was significantly observed

TABLE 4

|  | Example | | | | | | | | | | Comparative Example | |
|---|---|---|---|---|---|---|---|---|---|---|---|---|
|  | 10 | 11 | 12 | 13 | 14 | 15 | 16 | 17 | 18 | 19 | 3 | 4 |
| Liquid composition | 1 | 2 | 3 | 4 | 5 | 6 | 7 | 8 | 9 | 1 | 10 | 11 |
| Ink | 1 | 1 | 1 | 1 | 1 | 1 | 1 | 1 | 1 | 2 | 1 | 1 |
| Beading | A | A | A | A | A | A | B | A | A | B | A | A |

Having now fully described embodiments of the present invention, it will be apparent to one of ordinary skill in the art that many changes and modifications can be made thereto without departing from the spirit and scope of embodiments of the invention as set forth herein.

This patent application is based on and claims priority pursuant to 35 U.S.C. § 119 to Japanese Patent Application Nos, 2018-39901 and 2018-195171, filed on Mar. 6, 2018 and Oct. 16, 2018, respectively, in the Japan Patent Office, the entire disclosure of which is hereby incorporated by reference herein.

REFERENCE SIGNS LIST

1 Member of image forming device
2 Recording medium
3 Liquid composition
4 Liquid composition
5 Inorganic particle
6 Components of liquid composition other than inorganic particle
101 Image forming device
107K, 107C, 107M, 107Y Ink cartridges
110 K, 110 C, 110 M, 110 Y Head units
114 Recording medium
130 Application assembly
135 Liquid composition accommodating tank
136 Application roller
200 Roller

The invention claimed is:

1. A liquid composition, comprising:
0.05-2.0% by mass of an inorganic particle; and
a multivalent metal salt,
wherein the liquid composition has a tacking force of 50 mN or less in an area of cast-coated paper where: the liquid composition is applied in an amount of 0.12 mg/cm² for the cast-coated paper followed by heating at 80 degrees C. for 15 seconds, wherein % by mass is based on a total amount of the liquid composition, and
said liquid composition is capable of preventing a liquid composition from adhering to a member.

2. The liquid composition according to claim 1, wherein the liquid composition is applied before ink application.

3. The liquid composition according to claim 1, wherein the inorganic particle comprises a metal oxide.

4. The liquid composition according to claim 1, wherein the inorganic particle comprises at least one member selected from the group consisting of $SiO_2$, $Al_2O_3$, $TiO_2$, ZnO, and $ZnO_2$.

5. The liquid composition according to claim 1, wherein the inorganic particle accounts for 0.5 to 1.0 percent by mass of a total amount of the liquid composition.

6. The liquid composition according to claim 1, wherein a proportion of the inorganic particle in the liquid composition to the multivalent metal salt in the liquid composition is 4.0 percent by mass or less.

7. The liquid composition according to claim 1, wherein the tacking force is 40 mN or less.

8. The liquid composition according to claim 2, wherein the multivalent metal salt causes aggregation of a coloring material contained in ink for the ink application.

9. A device for applying the liquid composition of claim 1, comprising:
a liquid composition accommodating device accommodating the liquid composition of claim 1; and
a liquid composition applying device configured to apply the liquid composition of claim 1 to a recording medium.

10. An image forming device, comprising: the liquid composition accommodating device of claim 9; the liquid composition applying device of claim 9; and
an ink applying device configured to apply ink to an area of the recording medium where the liquid composition is applied.

11. The image forming device according to claim 10, further comprising a member disposed in a conveyance path of the recording medium between a position of the liquid composition applying device and a position of the ink applying device, the member being configured to contact at least partially the area of the recording medium.

12. The image forming device according to claim 11, wherein the member comprises a roller.

13. An image forming method, comprising:
applying the liquid composition of claim 1 to the recording medium; and
applying the ink to an area where the liquid composition of claim 1 is applied.

14. The liquid composition according to claim 1, wherein the inorganic particle has a volume average particle diameter of 5 to 50 nm.

15. The liquid composition according to claim 1, further comprising glycerin in a mass ratio of glycerin to multivalent metal salt of 0.5 to 2.0.

16. The liquid composition according to claim 1, wherein a content of the multivalent metal salt is 0.8 to 1.4 mol/l.

17. The liquid composition according to claim 1, wherein a mass ratio of the inorganic particle to the multivalent metal salt is 0.5 to 10.0 percent by mass.

18. The liquid composition according to claim 1, further comprising a water-soluble organic solvent.

19. The liquid composition according to claim 1, wherein the liquid composition has a viscosity at 25° C. of 5 to 30 mPa s.

* * * * *